United States Patent
Wu et al.

(10) Patent No.: US 11,701,623 B2
(45) Date of Patent: Jul. 18, 2023

(54) METHOD OF FORMING A LAMINATED SINGLE LAYER COMPOSITE MEMBRANE

(71) Applicant: ENTEGRIS, INC., Billerica, MA (US)

(72) Inventors: Dongzhu Wu, Somerville, MA (US); Kwok Shun Cheng, Nashua, NH (US); Rajnikant B. Patel, Tewksbury, MA (US); Tony Yu, Quincy, MA (US); Puth Proeung, Lowell, MA (US); Maybelle Woo, Dedham, MA (US)

(73) Assignee: ENTEGRIS, INC., Billerica, MA (US)

( * ) Notice: Subject to any disclaimer, the term of this patent is extended or adjusted under 35 U.S.C. 154(b) by 126 days.

(21) Appl. No.: 17/320,973

(22) Filed: May 14, 2021

(65) Prior Publication Data

US 2021/0354092 A1   Nov. 18, 2021

Related U.S. Application Data

(60) Provisional application No. 63/025,660, filed on May 15, 2020.

(51) Int. Cl.
| | |
|---|---|
| *B01D 67/00* | (2006.01) |
| *B01D 69/02* | (2006.01) |
| *B01D 69/12* | (2006.01) |
| *B01D 71/26* | (2006.01) |

(52) U.S. Cl.
CPC ....... *B01D 69/122* (2013.01); *B01D 67/0002* (2013.01); *B01D 69/02* (2013.01); *B01D 71/26* (2013.01); *B01D 2323/08* (2013.01); *B01D 2325/04* (2013.01)

(58) Field of Classification Search
CPC ............ B01D 2323/08; B01D 67/0002; B01D 69/122
See application file for complete search history.

(56) References Cited

U.S. PATENT DOCUMENTS

| | | | |
|---|---|---|---|
| 5,366,631 A | 11/1994 | Adiletta | |
| 8,820,540 B2 | 9/2014 | Koo | |
| 9,073,061 B2 | 7/2015 | Goldbach | |
| 9,428,594 B2 | 8/2016 | Rastogi et al. | |
| 2009/0117455 A1* | 5/2009 | Takita ................. | H01M 50/406 264/45.9 |
| 2011/0024348 A1 | 2/2011 | Meyer-Blumenroth | |
| 2014/0339722 A1 | 11/2014 | Yen et al. | |
| 2015/0273401 A1 | 10/2015 | Miller | |

FOREIGN PATENT DOCUMENTS

| | | | | |
|---|---|---|---|---|
| EP | 2111910 A1 * | 10/2009 | ........... | B01D 67/002 |
| EP | 1930157 A1 | 4/2013 | | |
| WO | 2010079174 A2 | 7/2010 | | |

* cited by examiner

*Primary Examiner* — Bradley R Spies

(57) ABSTRACT

The present disclosure relates to a composite membrane formed by lamination of two or more separate porous polymeric layers, as well as to a method and system for lamination. Advantageously, the resulting composite is a single layer, being difficult to separate into its component layers, yet effectively maintains the filtering capabilities of the component layers when not laminated.

19 Claims, 3 Drawing Sheets

METHOD OF FORMING A LAMINATED SINGLE LAYER COMPOSITE MEMBRANE

CROSS-REFERENCE TO RELATED APPLICATIONS

This application claims the benefit under 35 USC 119 of U.S. Provisional Patent Application No. 63/025,660 filed May 15, 2020, the disclosure of which is hereby incorporated herein by reference in its entirety.

FIELD OF THE INVENTION

The present disclosure relates to composite membranes prepared by lamination of separate porous polymeric layers without an adhesive, forming a single layer composite.

BACKGROUND

Different types of porous polymeric membranes have been used for removing unwanted materials from a flow of fluid to be purified, and these have found utility in a variety of industrial applications. Fluids that are treated to remove unwanted materials include water, liquid industrial solvents and processing fluids, industrial gases used for manufacturing or processing, and liquids that have medical or pharmaceutical uses. Unwanted materials that are removed from fluids include impurities and contaminants such as particles, microorganisms, and dissolved chemical species, such as ionic species. Examples of filter applications include purification of various liquid materials used in semiconductor and microelectronic device manufacturing.

Polymeric layers of porous materials can be combined in different arrangements to form porous polymeric membranes configured to achieve removal of targeted materials. For example, some porous layers are capable of removing impurities via a sieving mechanism in which particles present within the liquid that are larger than the pores of the member are prevented from passing through, being trapped on or within the membrane by their relative sizes. Other membranes function via a non-sieving mechanism in which impurities that are smaller than the membrane pores are trapped within the pores by interactions with the membrane material. By combining a non-sieving membrane with a sieving membrane, both large and smaller particles may be removed.

As is known in the art, it is difficult to combine membranes of different types to form a single layer composite membrane material having good flow properties. Typically, one porous layer is placed in contact with another porous layer using an adhesive interlayer and/or with strong compression. However, the presence of an adhesive can interfere with membrane performance. Filter flow is often significantly reduced as pores become clogged or collapse due to the adhesive. In addition, the presence of the adhesive can add impurities into the liquid passing through the composite. Coextrusion may also be used, but this is not practical for combining polymeric layers with dissimilar membrane morphologies, and the heating needed to extrude the polymeric materials often deteriorates their pore structure. Likewise, the use of excessive compression to force two individual porous layers into intimate contact, forming a single layer, can collapse the pore structure, both throughout the porous layers as well as at the interface. For this reason, porous polymeric layers of different morphologies are generally positioned in a stacked arrangement of separate retentive layers in order to preserve their individual filtration capabilities. However, handling such a filter, in which individual layers are not adhered together, can be very difficult, particularly when one or both of the layers are very thin.

Therefore, there is need for a method of combining porous polymeric layers to form a composite membrane that functions as a single layer yet maintains the features of the individual layers from which it was prepared.

SUMMARY OF THE INVENTION

The present disclosure generally relates to a composite membrane formed by lamination of two or more separate porous layers, as well as to a method and system for lamination. Advantageously, the resulting composite is a single layer, being able to be handled without the composite readily separating into its component layers, yet effectively maintains the filtering capabilities of the component layers prior to being laminated.

In one embodiment, the present disclosure relates to a composite membrane comprising a first porous polymeric layer laminated with a second porous polymeric layer. The composite membrane is free of an added adhesive. Preferably the first porous polymeric layer has a different morphology than the second porous polymeric layer, and, more preferably, the layers are different in thickness. The composite membrane is a single layer and has substantially the same flow rate and/or flow time as a non-laminated composite of these same layers.

In another embodiment, the present disclosure relates to a composite membrane comprising a first region and a second region, and wherein the composite has no interlayer region between the first region and the second region and comprising both the first porous polymer and the second porous polymer. The first region comprises a first porous polymer and has a thickness of less than about 20 μm. The second region comprises a second porous polymer and has a thickness of from about 50 μm to about 200 μm. Preferably, the second porous polymer is different from the first porous polymer. The first region, the second region, or both may further comprise a compressed region.

In another embodiment, the present disclosure relates to a method of forming a composite membrane comprising feeding a first porous polymeric layer and a second porous polymeric layer into a laminator and heating the first porous polymeric layer and the second porous polymeric layer to a lamination temperature in the laminator. The heated first porous polymeric layer and the heated second polymeric layer are laminated together without an adhesive to form the composite membrane, which can be subsequently cooled.

Figure 1:
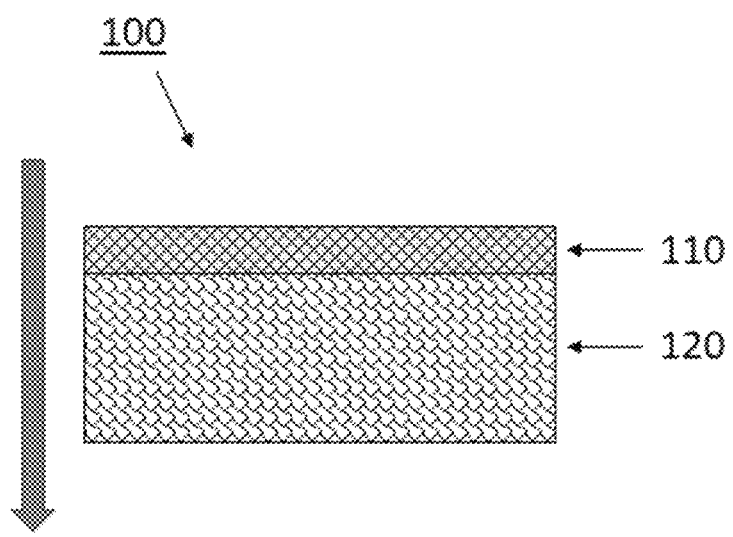
FIG. 1 is a schematic view of an embodiment of a single layer composite membrane of the present disclosure comprising two porous polymeric layers.

It should be understood that the above-referenced figures are not necessarily to scale and may, in some cases, present a somewhat simplified representation of various preferred features illustrative of the basic principle of the disclosure. The specific design features of the present disclosure, including, for example, specific dimensions, orientations, locations, and shapes, will be determined in part by the intended application and use environment.

DETAILED DESCRIPTION OF THE INVENTION

The present disclosure relates to a composite membrane formed by lamination of two or more separate porous polymeric layers, as well as to a method and system for the lamination of two or more separate porous polymeric layers.

The resulting composite membrane disclosed herein is essentially a single layer yet has filtration properties substantially the same as a stacked combination of the porous polymeric layers from which it was prepared. For example, the composite membrane comprises two or more separate porous polymeric layers laminated together to form a single layer.

As used herein, a "porous polymeric layer" is a polymeric material that contains porous (e.g., microporous) interconnecting passages that extend from one surface of the layer to the opposite surface of the layer. The passages generally provide tortuous tunnels or paths through which a liquid being filtered must pass. Contaminants, such as particles or dissolved species, passing through the porous polymeric layer become trapped by or within the pores, either based on size (i.e., a sieving mechanism) or based on chemistry (i.e., a non-sieving mechanism").

A variety of different types of polymeric layers may be used to form the composite membrane of the present disclosure. Each of the polymeric layers may be the same or different, depending on the target application for the composite membrane, cost, material availability, etc. For example, in one embodiment, the composite membrane comprises a first porous polymeric layer laminated with a second porous polymeric layer, wherein each layer is the same or different in material type and/or filtration mechanism (sieving or non-sieving). Suitable polymeric layers include, for example, a polyamide, a polysulfone, a polyether-sulfone, and a polyolefin layer.

Surprisingly, it has been found that a single layer composite material can be formed from two different types of porous polymeric layers laminated using the techniques described herein, without significantly reducing flow performance. For example, it has been found that a porous polymeric layer capable of removing impurities by a sieving mechanism can be laminated without an adhesive with a porous polymeric layer capable of removing impurities by a non-sieving mechanism, producing a single layer composite membrane with excellent filtration and flow performance properties. The single layer composite membrane may comprise the porous polymeric layers in any order, such as a non-sieving layer laminated on top of a sieving layer or vice versa. The positioning of the layers described herein (i.e., top, first, second, etc.) is relative to the intended flow direction of a fluid to be passed through the composite membrane, with the top layer being the first porous polymeric layer to be contacted by the fluid.

The thicknesses of the layers of the composite membrane may be varied depending on, for example, cost, availability, and handleability (i.e., physical and/or mechanical properties) of the polymeric layers from which it is formed. For example, for a composite membrane comprising a first porous polymeric layer laminated with a second porous polymeric layer, the first porous polymeric layer may have the same or different thickness than the second porous polymeric layer. In some embodiments, the porous polymeric layers may differ in thickness. For example, the first porous polymeric layer, intended to be in contact first with a target fluid, may have a thickness that is less than the thickness of the second porous polymeric layer. In particular, the first porous polymeric layer may be an ultrathin porous layer having a thickness of less than 20 µm, including less than 10 µm and less than 5 µm. The second porous polymer layer may be relatively thicker, having a thickness that is greater than 20 µm, such as from about 20 µm to about 200 µm, including about 50 µm to about 200 µm, from about 50 µm to about 150 µm, and from about 50 µm to about 100 µm. Surprisingly, it has been found that, using the techniques described herein, an ultrathin porous layer may be laminated with a thicker layer while substantially maintaining flow through the resulting single layer composite.

While the porous polymeric layers of the composite membrane may comprise a variety of materials having thicknesses in these ranges, in some embodiments, the single layer composite membrane comprises a porous polyethylene (PE) layer laminated with a porous polyolefin layer, such as an ultrahigh molecular weight polyethylene (UHMWPE) layer. The porous PE layer may comprise a stretched polyethylene, prepared, for example, by extrusion of a polyethylene resin containing a dilutant that is subsequently stretched, extracted, and finally annealed. Various stretched porous PE layers would be known to one of ordinary skill in the art and may be used in embodiments of the present disclosure. The UHMWPE layer may be any known in the art and are typically formed from a resin having a molecular weight greater than about $1 \times 10^6$ Daltons (Da), such as in the range of about $1 \times 10^6$-$9 \times 10^6$ Da, or $1.5 \times 10^6$-$9 \times 10^6$ Da. These porous polymers can also be formed to have a symmetric pore size distribution or an asymmetric pore size distribution (such as decreasing in pore size from one side of the porous polymeric layer to the opposing side).

Figure 2:
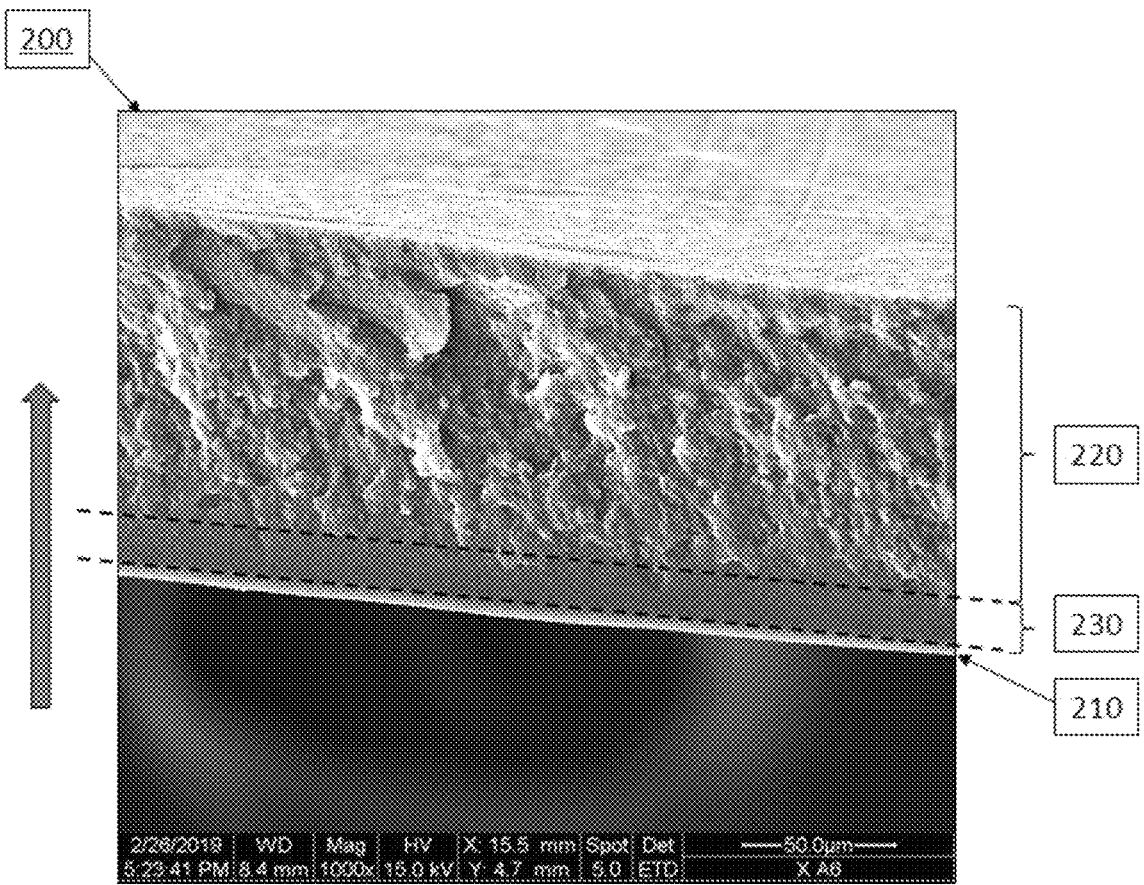
FIG. 2 is a micrograph of an embodiment of the single layer composite membrane of the present disclosure comprising two different porous polymeric layers.

A specific embodiment of the present disclosure is shown in FIGS. 1 and 2. In particular, FIG. 1 shows a composite membrane comprising two different porous polymeric layers laminated together. As shown, composite membrane 100 comprises first porous polymeric layer 110 and second porous polymeric layer 120, with the order of these layers being relative to the intended flow of a target liquid through the composite membrane, as shown by the arrow. For this embodiment, the first porous polymeric layer has a thickness that is less than the thickness of the second porous polymeric layer. Also, these layers are different materials. However, as discussed above, it is within the scope of the present disclosure that the two layers may be the same and/or that the thickness of the second layer may be the same as or less than the first layer.

Importantly, as shown in FIGS. 1 and 2, the composite membrane does not comprise an adhesive or adhesive layer between first porous polymeric layer 110 and second porous polymeric layer 120. Also, preferably, no interlayer is formed comprising both of the porous polymeric layers, as discussed in more detail below. Rather, as shown, the two porous polymeric layers are in direct contact with each other.

Furthermore, the contacted layers remain in contact after lamination, particularly during handling, thereby forming a single layer composite. As used herein, the term "single layer composite" relates to a composite material formed from two or more separate porous layers that does not readily separate into its constituent porous polymeric layers, thereby allowing the composite to be handled as a single unit or layer. Rather, an applied force is needed in order to separate the layers of the single layer composite. For example, in an embodiment of the present disclosure, the layers of the composite membrane can be separated into the original starting porous polymeric layers using a peel force from about 0.5 lbf to about 5 lbf, such as from about 0.8 lbf to about 3 lbf or from about 1.0 lbf to about 2.0 lbf, including about 1.5 lbf. These force values are generally higher than would be experienced during normal membrane handling, such as during pleating, enabling formation of filter devices from this single layer composite.

A more detailed view is shown in FIG. 2, which is a micrograph of a specific embodiment of a composite membrane of the present disclosure. This composite membrane comprises a first porous polymeric layer laminated with a second porous polymer layer, with this positioning being relative to the intended flow direction in use, indicated by the arrow. For this specific embodiment the first porous polymeric layer is a stretched porous PE layer and the second porous polymeric layer is a solution cast porous UHMWPE layer. These layers were laminated by the method of the present disclosure and do not comprise an adhesive layer between them, which is clearly shown in the micrograph of FIG. 2.

While not comprising an adhesive layer, the two layers were also surprisingly found to adhere well together, not being easily separable from each other, and the composite membrane is a single layer composite. As shown in FIG. 2, composite membrane 200 comprises first region 210 formed by the first porous polymer layer and second region 220 formed from the second porous polymer layer. The thickness of the first region is less than 20 μm, and the thickness of the second region is from about 50 μm to about 200 μm. However, composite member 200 does not further comprise any interlayer region, which comprises either an adhesive or the combination of both the first porous polymeric layer and the second porous polymeric layer. Instead, as shown, the two layer are in direct contact with each other, with no air pockets formed in between. As discussed in more detail below, compression may be used to bring the combined layers into contact, without significantly impacting the porosity of the layers. This is also shown in FIG. 2, in which second region 220 includes compression region 230, and this region is still highly porous. Close inspection of first region 210 also shows the presence of a compression region. Without wishing to be bound by any particular theory, it is believed that the combination of lamination temperature and mild compression may force the individual porous polymeric layers into intimate contact without significantly decreasing their relative pore structures. This enables the combined layers to function as a single layer membrane with minimal overall flow loss. Thus, composite membrane 200 can be handled and further processed as a single layer membrane, such as by pleating or otherwise folding to fit within a desired filter housing, without concern that the layers will separate.

Since the porous nature of each of the polymeric layers is substantially maintained, the single layer composite may be used as a membrane for removing impurities and contaminants from a target liquid stream with minimal loss of flow or throughput. For example, surprisingly it has been found that the single layer composite membrane of the present disclosure has a flow rate of a test fluid such as isopropyl alcohol (IPA) that is greater than or equal to 90% of the flow rate of this fluid through a non-laminated combination of the two porous polymeric layer (i.e., a stacked composite in which the two porous polymeric layers are in contact but do not adhere together and can easily be separated). Thus, the loss in flow rate is 10% or less. In addition, or alternatively, the single layer composite membrane has been found to have a flow time of a test fluid such as IPA that is greater than or equal to 120% of the flow time of the corresponding non-laminated combination of these layers (i.e., the flow time does not increase by more than 20%). Thus, the single layer composite membrane has flow characteristics that are substantially the same as the flow characteristics of a stacked arrangement of the porous polymeric layers used to form it. The flow time is measured as the time it takes for 500 mL of isopropyl alcohol (IPA) fluid to pass through a membrane with a surface area of 13.8 $cm^2$ at 14.2 psi, and at a temperature 21 degrees Celsius. The flow rate is measured by measuring the total volume of isopropyl alcohol (IPA) fluid that passes through a membrane with a surface area of 13.8 $cm^2$ at 14.2 psi, and at a temperature 21 degrees Celsius, over a one minute period of time.

In some embodiments, bubble point values also remain substantially unchanged. For example, if the bubble point of the first porous polymeric layer is greater than the bubble point of the second porous polymeric layer, it has surprisingly been found that the bubble point of the single layer composite membrane may be greater than or equal to 90% of the first (i.e., higher) bubble point. As is known in the art, the bubble point method is based on the premise that, for a particular fluid and pore size with constant wetting, the pressure needed to force an air bubble through the pore is in inverse proportion to the size of the pore. A higher bubble point value relates to small pore sizes. To determine the bubble point of a porous material a sample of the porous material is immersed in and wetted with ethoxy-nonafluorobutane HFE 7200 (available from 3M) at a temperature of 20-25 degrees Celsius (e.g., 22 degrees Celsius). A gas pressure is applied to one side of the sample by using compressed air and the gas pressure is gradually increased. The minimum pressure at which the gas flows through the sample is called the bubble point. When measuring the bubble point for the single layer composite membranes disclosed herein the compressed air is directed through the polymeric porous layer having the greater thickness. It has been found that the single layer composite membrane of the present disclosure, laminated using the method described herein, does not significantly decrease pore diameter but substantially maintains the bubble point of the porous polymeric layer having the highest bubble point. Thus, pore diameter is not significantly reduced.

Thus, the present disclosure further relates to a method of preparing a single layer composite membrane lamination. In embodiments of the method, two or more porous polymeric layers (such as a first porous polymeric layer and a second porous polymeric layer as described above) are provided and feed into a laminator to be combined. Preferably the laminator is a single laminator unit, although multiple lamination zones may be used. The two of more layers are heated within the laminator to a temperature that is sufficient to cause lamination of the layers without the use of an adhesive and laminated at this temperature to form a single layer composite. Heating and lamination may be done simultaneously or in separate steps. The formed composite membrane can then be allowed to cool. For example, a cooling zone may be used to allow the composite to set. By "laminated" is meant that, after cooling, the layers remain adhered together and are not readily separable, requiring, for example, a force to peel them apart. For example, the peel force to separate the layers may be from about 0.5 lbf to about 5 lbf, such as from about 0.8 lbf to about 3 lbf or from about 1.0 lbf to about 2.0 lbf, including about 1.5 lbf. Since a force is needed to separate the laminated porous polymeric layers from which the composite membrane is prepared, this composite would therefore be capable of functioning as a single layer composite.

Any of the porous polymeric layers described above can be used in the present lamination method. These layers may be the same or different, but preferably are different in polymer type, thickness, and/or porosity. For example, the first porous polymeric layer may be an ultrathin porous layer, such as a stretched porous PE layer, having a thickness of less than 20 μm. The second porous polymeric layer may be a polyolefin layer, such as a porous UHMWPE layer, having a thickness of from about 50 μm to about 200 μm.

In the method of the present disclosure, the two or more layers are heated to a lamination temperature, which is a temperature sufficient to cause the layers to adhere together but without significantly impacting the porosity of either layer. The lamination temperature is therefore dependent on the type of porous polymeric layers being combined in the laminator. In particular, the lamination temperature may be between 5° C. and 20° C. below the lowest melting temperature of the two or more layers to be laminated. For example, for laminating a first porous polymeric layer and a second porous polymeric layer, if the first layer has a lower melting temperature than the second layer, the lamination temperature is 5° C. to 20° C. below the melting temperature of the first porous polymer layer. Compression is not required to form the single layer composite membrane. However, if desired, a minimal compression pressure may also be applied, as long as the amount of compression does not significantly change (i.e., reduce) the porosity of any of the layers being laminated, as determined by the flow rates, flow times, and/or bubble point values described above. As discussed above, use of compression may form a compression region within the individual layers, preferably near or at the interface. However this compression region is still highly porous.

Figure 3:
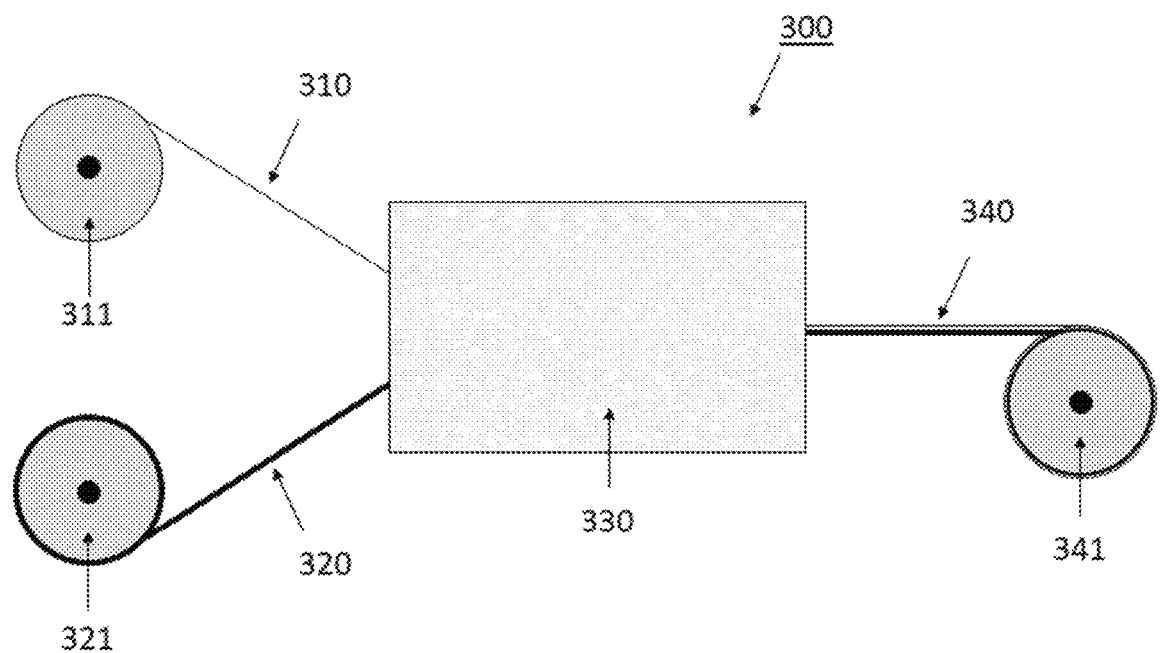
FIG. 3 is a schematic view of an embodiment of the laminating system for preparing the composite member of the present disclosure.

FIG. 3 shows an embodiment of a laminator system for forming a single layer composite membrane by the method of the present disclosure. As shown, laminator system 300 includes laminator 330 into which first porous polymeric layer 310, from take-off roll 311, and second porous polymeric layer 320, from take-off roll 321, are fed. Laminator 330 is heated to a lamination temperature determined by the relative melting temperatures of the first and second porous polymeric layers, to form composite membrane 340. Since this composite membrane is a single layer composite, the membrane can be easily handled without separating, such as being received on take-up roll 341 for additional processing, such as pleating.

The features and advantages of the etchant compositions of the present disclosure are more fully illustrated by the following non-limiting examples.

Examples

Two porous polymeric layers were combined in a laminator and heated to a lamination temperature that was 15° C. below the melt temperature of the polymer layer having the lowest melt temperature. The first porous polymeric layer was a stretched polyethylene having a thickness of about 4 μm and the second porous polymeric layer was ultrahigh molecular weight polyethylene (UHMWPE) having a thickness of about 152 μm. The separate layers were thereby laminated without the use of an adhesive, and subsequently cooled to form a single layer composite membrane. Properties of the porous polymeric layers and the resulting composite membrane are shown in Table 1. Flow rate, flow time and bubble point were calculated as described above. Flow rate and flow time values of the single layer composite membranes were compared to a stacked arrangement of the same porous polymer layers, and these are used to calculate the flow rate loss and the flow time loss.

TABLE 1

| | Thickness | Flow Time | Flow Time Increase | Flow Rate | Flow Rate Loss | Bubble Point |
|---|---|---|---|---|---|---|
| Stretched PE | 4 μm | 5.7K sec | — | 233 LMH/bar | — | 170 psi |
| UHMWPE | 152 μm | 6.3K sec | — | 211 LMH/bar | — | 110 psi |
| Composite membrane | 155 μm | 13.7K sec | 9.6% | 99.8 LMH/bar | 9.3% | 173 psi |
| Stacked Membrane (not laminated) | 156 μm | 12.5K sec | — | 110 LMH/bar | — | — |

As the data shows, using the method of the present disclosure, a single layer composite membrane can be formed from different individual porous polymeric layers by lamination without an adhesive and without having a significant impact on membrane performance, as shown by the minimal changes in flow time, flow rate, and bubble point. For example, the composite membrane has a flow rate that is greater than or equal to 90% of a flow rate of a non-laminated, stacked composite of the first porous polymer layer and the second porous polymeric layer (i.e., the flow rate loss is less than 10%) and/or the composite membrane has a flow time that is less than 120% of a flow time of a non-laminated, stacked composite of the first porous polymer layer and the second porous polymeric layer (i.e., the increase in flow time is less than or equal to 20%), and/or the first porous polymeric layer has a first bubble point, the second porous polymeric layer has a second bubble point, and the first bubble point is greater than the second bubble point, and wherein the composite membrane has a bubble point that is greater than or equal to 90% of the first bubble point of the first porous polymeric layer. The overall thickness is slightly less than the combined thicknesses of the individual layers, indicating the presence of a compression. Yet, this mild compression no significant impact on performance. The resulting single layer composite membrane is therefore well suited for the rigorous purification requirements of the semiconductor industry.

Although the composite membrane and method of lamination have been variously disclosed herein with reference to illustrative embodiments and features, it will be appreciated that the embodiments and features described hereinabove are not intended to limit the scope of the disclosure, and that other variations, modifications and other embodiments will suggest themselves to those of ordinary skill in the art, based on the disclosure herein. The disclosure therefore encompasses all such variations, modifications and alternative embodiments within the spirit and scope of the claims hereafter set forth.

In a first aspect, a composite membrane comprises: a first porous polymeric layer; and a second porous polymeric layer laminated with the first porous polymeric layer, wherein the composite membrane is free of an adhesive.

A second aspect according to the first aspect is wherein the first porous polymeric layer, the second porous polymeric layer, or both are selected from the group consisting of a polyamide, a polysulfone, a polyether-sulfone, and a polyolefin, and wherein the first porous polymeric layer and the second porous polymeric layer are different.

A third aspect according to the first or second aspect is wherein the first porous polymeric layer has a thickness of less than 20 µm.

A fourth aspect according to the third aspect is wherein the first porous polymeric layer is a stretched polyethylene layer.

A fifth aspect according to any of the preceding aspects is wherein the second porous polymeric layer is a polyolefin layer having a thickness of from about 50 µm to about 200 µm.

A sixth aspect according to the fifth aspect is wherein the polyolefin layer is an ultra-high molecular weight polyethylene (UHMWPE) layer.

A seventh aspect according to any of the preceding aspects is wherein the composite membrane has a flow rate that is greater than or equal to 90% of a flow rate of a non-laminated composite of the first porous polymer layer and the second porous polymeric layer.

An eighth aspect according to any of the preceding aspects is wherein the composite membrane has a flow time increase that is less than or equal to 20% of a flow time of a non-laminated composite of the first porous polymer layer and the second porous polymeric layer.

A ninth aspect according to any of the preceding aspects is wherein the first porous polymeric layer has a first bubble point, the second porous polymeric layer has a second bubble point, and the first bubble point is greater than the second bubble point, and wherein the composite membrane has a bubble point that is greater than or equal to 90% of the first bubble point of the first porous polymeric layer.

In a tenth aspect, a composite membrane comprises: a first region comprising a first porous polymer and having a thickness of less than about 20 µm and a second region comprising a second porous polymer and having a thickness of from about 50 µm to about 200 µm, wherein the second porous polymer is different from the first porous polymer, and wherein there is no interlayer region between the first region and the second region.

An eleventh aspect according to the tenth aspect is wherein the first region, the second region, or both the first region and the second region comprise a porous compression region.

A twelfth aspect according to the tenth or eleventh aspects is wherein the first porous polymer is a stretched polyethylene.

A thirteenth aspect according to any of the tenth through twelfth aspects is wherein the second porous polymer is a polyolefin.

In a fourteenth aspect, a method of forming a composite membrane comprises: providing a first porous polymeric layer and a second porous polymeric layer in a laminator; heating the first porous polymeric layer and the second porous polymeric layer to a lamination temperature in the laminator; and laminating the heated first porous polymeric layer and the heated second polymeric layer together without an adhesive to form the composite membrane.

A fifteenth aspect according to the fourteenth aspect further comprises compressing the composite membrane during or after laminating.

A sixteenth aspect according to the fourteenth or fifteenth aspects is wherein the first porous polymeric layer is an ultra-thin porous polymeric layer having a thickness of less than 20 µm.

A seventeenth aspect according to the sixteenth aspect is wherein the ultra-thin porous polymeric layer is a stretched polyethylene layer.

An eighteenth aspect according to the fourteenth through seventeenth aspects is wherein the second porous polymeric layer is a polyolefin layer having a thickness of from about 50 µm to about 200 µm.

A nineteenth aspect according to the eighteenth aspect is wherein the polyolefin layer is an ultra-high molecular weight polyethylene (UHMWPE) layer.

A twentieth aspect according to any of the fourteenth through nineteenth aspects is wherein the first porous polymeric layer has a first melting temperature and wherein the first porous polymeric layer is heated to a temperature that is between 5° C. and 20° C. below the first melting temperature.

A twenty-first aspect according to any of the fourteenth through nineteenth aspects is wherein the second porous polymeric layer has a second melting temperature, and wherein the second porous polymeric layer is heated to a temperature that is between 5° C. and 20° C. below the second melting temperature.

A twenty-second aspect according to any of the fourteenth through nineteenth aspects is wherein the composite membrane has a flow rate that is greater than or equal to 90% of a flow rate of a non-laminated composite of the first porous polymeric layer and the second porous polymeric layer.

In a twenty-third aspect, a filter comprises the composite membrane of any of the first through thirteenth aspects.

What is claimed is:

1. A composite membrane comprising:
    a first porous polymeric layer having a first bubble point; and
    a second porous polymeric layer having a second bubble point and laminated with the first porous polymeric layer,
    wherein the composite membrane is free of an adhesive, the first bubble point is greater than the second bubble point, and the composite membrane has a bubble point that is greater than or equal to 90% of the first bubble point of the first porous polymeric layer.

2. The composite membrane of claim 1, wherein the first porous polymeric layer has a thickness of less than 20 µm.

3. The composite membrane of claim 2, wherein the first porous polymeric layer is a stretched polyethylene layer.

4. The composite membrane of claim 1, wherein the second porous polymeric layer is a polyolefin layer having a thickness of from about 50 µm to about 200 µm.

5. The composite membrane of claim 4, wherein the polyolefin layer is an ultra-high molecular weight polyethylene (UHMWPE) layer.

6. The composite membrane of claim 1, wherein the composite membrane has a flow rate that is greater than or equal to 90% of a flow rate of a non-laminated composite of the first porous polymeric layer and the second porous polymeric layer.

7. The composite membrane of claim 1, wherein the composite membrane has a flow time increase that is less than or equal to 20% of a flow time of a non-laminated composite of the first porous polymeric layer and the second porous polymeric layer.

8. A composite membrane, comprising:
a first region comprising a first porous polymer and having a thickness of less than about 20 μm; and
a second region comprising a second porous polymer and having a thickness of from about 50 μm to about 200 μm,
wherein the second porous polymer is different from the first porous polymer,
wherein there is no interlayer region between the first region and the second region, and
wherein the composite membrane has a flow rate that is greater than or equal to 90% of a flow rate of a non-laminated composite of the first porous polymer and the second porous polymer.

9. The composite membrane of claim 8, wherein the first region, the second region, or both the first region and the second region comprise a porous compression region.

10. The composite membrane of claim 8, wherein the first porous polymer is a stretched polyethylene.

11. The composite membrane of claim 8, wherein the second porous polymer is a polyolefin.

12. A method of forming a composite membrane comprising:
i) providing a first porous polymeric layer and a second porous polymeric layer in a laminator;
ii) heating the first porous polymeric layer and the second porous polymeric layer to a lamination temperature in the laminator; and
iii) laminating the heated first porous polymeric layer and the heated second porous polymeric layer together without an adhesive to form the composite membrane,
wherein the composite membrane has a flow time increase that is less than or equal to 20% of a flow time of a non-laminated composite of the first porous polymeric layer and the second porous polymeric layer.

13. The method of claim 12, further comprising compressing the composite membrane during or after laminating.

14. The method of claim 12, wherein the first porous polymeric layer is an ultra-thin porous polymeric layer having a thickness of less than 20 μm.

15. The method of claim 12, wherein the second porous polymeric layer is a polyolefin layer having a thickness of from about 50 μm to about 200 μm.

16. The method of claim 12, wherein the first porous polymeric layer has a first melting temperature and wherein the first porous polymeric layer is heated to a temperature that is between 5° C. and 20° C. below the first melting temperature.

17. The method of claim 12, wherein the second porous polymeric layer has a second melting temperature, and wherein the second porous polymeric layer is heated to a temperature that is between 5° C. and 20° C. below the second melting temperature.

18. A filter comprising the composite membrane of claim 1.

19. A filter comprising the composite membrane made by the method of claim 12.

* * * * *